United States Patent [19]

Yamada

[11] 4,309,090

[45] Jan. 5, 1982

[54] EXPOSURE INDICATING DEVICE

[75] Inventor: Seiji Yamada, Sakai, Japan

[73] Assignee: Minolta Camera Kabushiki Kaisha, Osaka, Japan

[21] Appl. No.: 69,853

[22] Filed: Aug. 27, 1979

[30] Foreign Application Priority Data

Aug. 31, 1978 [JP] Japan ................................ 53-107353
Sep. 14, 1978 [JP] Japan ................................ 53-113152

[51] Int. Cl.³ ...................... G03B 7/08; G03B 17/18; G01J 1/42
[52] U.S. Cl. .................................. 354/31; 354/60 A; 354/60 L; 356/222; 356/226
[58] Field of Search .............. 354/23 D, 31, 53, 60 A, 354/60 E, 60 L, 289; 356/221, 222, 226

[56] References Cited

U.S. PATENT DOCUMENTS

3,884,584 5/1975 Tsonekawa et al. ............. 354/31 X
4,176,955 12/1979 Yamada et al. ................ 354/60 L X

Primary Examiner—Lawrence R. Franklin
Assistant Examiner—William B. Perkey
Attorney, Agent, or Firm—Watson, Cole, Grindle & Watson

[57] ABSTRACT

An exposure indicating device indicates at the same time a result of average light measurement which measures a light level of a substantial portion of a scene to be photographed, and a result of spot light measurement which measures a brightness at a small portion of the scene. One of the values of the average and spot light measurements is displayed numerically to indicate its absolute value, while the other is displayed as a deviation from the former value.

17 Claims, 4 Drawing Figures

EXPOSURE INDICATING DEVICE

BACKGROUND OF THE INVENTION

1. Field of the Invention

The present invention relates to an exposure indicating device for indicating a proper exposure factor in accordance with light measurement of a photographic subject or an object to be photographed. In particular the invention relates to an exposure indicating device which provides indications of an exposure factor relying on average overall or integrated light measurement and partial or spot light measurement.

2. Description of the Prior Art

There have been proposed cameras provided with both an average overall or integrated light measuring system and a spot or partial light measuring system. Exposure meters having both such systems have also been proposed. In such known cameras and exposure meters, however, two systems were provided only for alternative selective use and its selection was left to the photographer's discretion. Therefore, the known exposure indicating device can provide only a single indication for a scene to be photographed. Such single indication may be effective for the scene in which brightness varies in relatively small range. However, when there is a large difference in brightness among objects in a scene, for example, in the case of back light photography wherein a relatively dark photographic subject is in front of a background of high brightness, the single indication can not provide satisfactory information whether it is based on average overall light measurement or spot light measurement. The average light measurement has an inclination to be affected more by the brightness of the light background, while the spot light measurement will provide an indication of a proper exposure condition but only for a particular portion of a scene. In such situation, it has been a common practice to set an exposure factor at a value somewhat shifted from the indicated value, the amount to be shifted being determined depending on anticipation by the user in accordance with his experiences. This practice is not rational and can not be employed by inexperienced photographers.

SUMMARY OF THE INVENTION

Accordingly, the primary object of the present invention is to provide an exposure indicating device which provides an exposure indication that is effective not only for scenes of small brightness variation but also for scenes of large brightness variation.

Another object of the present invention is to provide an exposure indicating device which provides at the same time two kinds of exposure indication for a photographic scene with respect to a single exposure factor.

Still another object of the present invention is to provide an exposure indicating device which indicates a value of an exposure factor as a function of a scene or object brightness and at the same time the variation of brightness in the scene.

A further object of the present invention is to provide an indicating device which displays a plurality of kinds of indications for a single factor in the manner that the user can easily understand the meaning of the indications at a glance.

Yet, a further object of the present invention is to provide an exposure indicating device for use in a photographic camera wherein exposure indications respectively in accordance with average overall light measurement and with spot light measurement are displayed at the same time.

A still further object of the present invention is to provide an exposure indicating device which indicates brightness at several points in a scene as well as average overall brightness level of the scene.

According to the present invention, there are provided an average overall light measuring system, a spot light measuring system and a display device responsive to both systems to display the results of the two kinds of light measurement at the same time.

In one aspect of an embodiment of the present invention, one of the results of the two kinds of light measurements is displayed in the form of numerals while the other is displayed in the form of a dot at a distance from a fixed point, with the distance being representative of the difference of the results in the level or degree. The fixed point may be represented by the position where the numerals are displayed.

According to an embodiment of the invention, the results of the two kinds of light measurement may be stored at any desired moment so that measurement at a desired time and/or at a desired portion or spot of a scene may be fixed and displayed. The spot light measurement may be stored in a plurality of storage devices at different times.

DETAILED DESCRIPTION OF THE PREFERRED EMBODIMENTS

Figure 1:
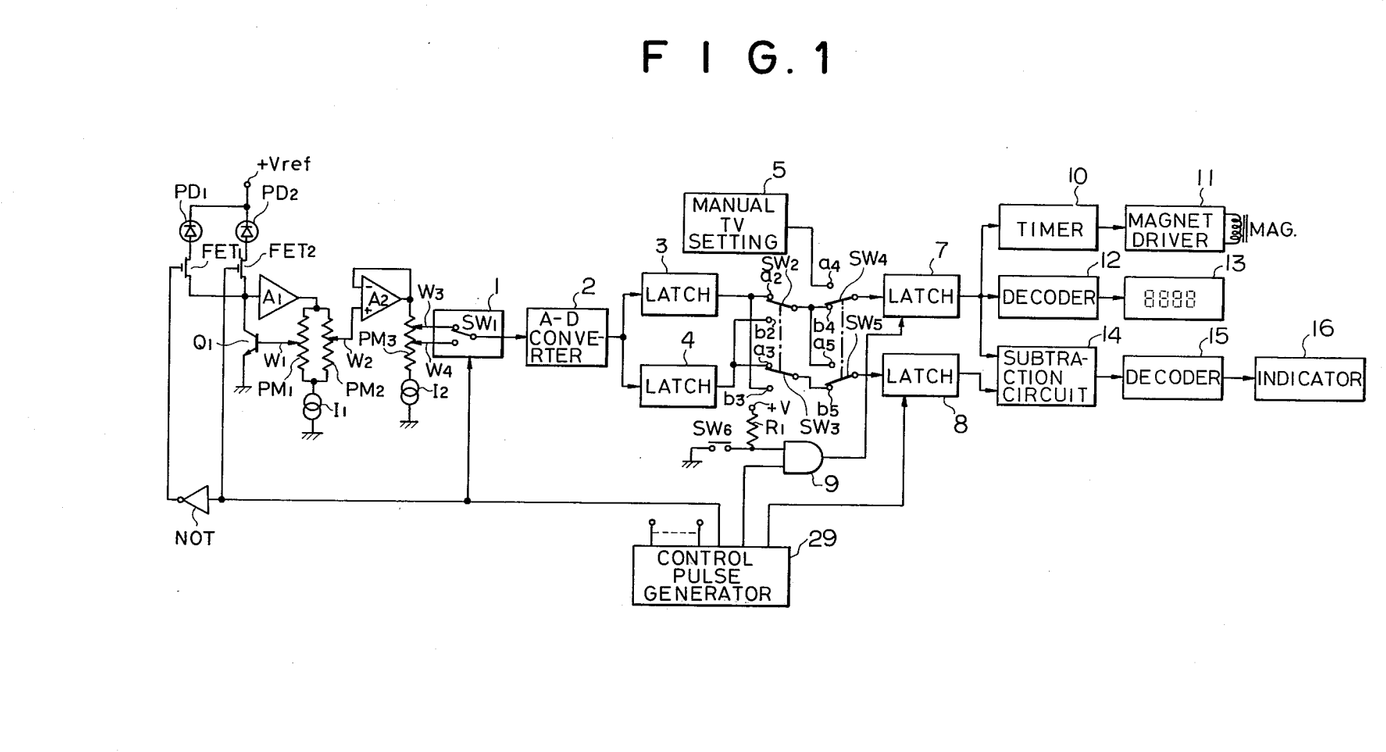
FIG. 1 is a schematic diagram showing exposure indicating circuitry according to one embodiment of the present invention.

With reference to FIG. 1, the circuitry shown is adapted to be associated with a camera wherein exposure time is automatically controlled in accordance with through-the-lens light measurement and with a diaphragm aperture value manually preselected. That is, the camera performs the function of diaphragm-priority automatic shutter control. The circuitry is designed to display, in the form of numerals, the indication commensurate with one of the outputs from an average overall light measuring system and a spot light measuring system, and display the other of the outputs as a step difference from the former output.

Figure 2:
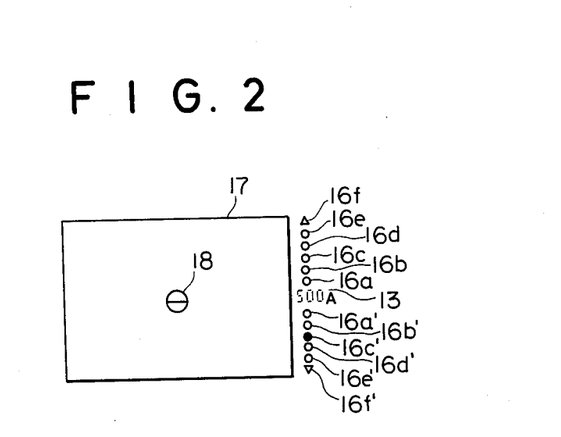
FIG. 2 is a schematic illustration of a view in a viewfinder in which the exposure indication by the present invention is made.
Figure 3:
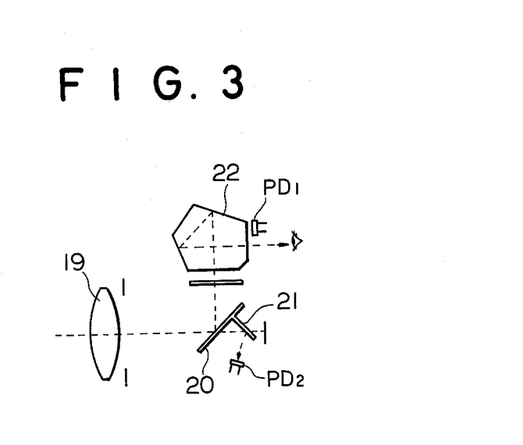
FIG. 3 is a schematic illustration of an optical system for a single lens reflex camera, exemplarily showing disposition of photocells for average overall and spot light measurements.

Photocell PD1 is disposed, as shown in FIG. 3, at the back of pentagonal prism 22 near the eyepiece to receive light from a large portion of a scene to be photographed, via camera objective 19, movable mirror 20, a focusing plate and pentagonal prism 22. Thus, the output of photocell PD1 represents an averaged brightness of the entire scene. It is, however, noted that photocell PD1 should not necessary receive the light from the entire scene, but may receive light from a substantial or large portion of the scene so long as it can evaluate the average or integrated light level of the scene. Photocell PD1 may include a single photoelectric element or a plurality of elements as the case may be. Photocell PD2 is disposed at the bottom of a camera body (not shown) to receive light from a particular small portion of the scene (for example, the portion viewed within the circle 18 of FIG. 2 through the viewfinder) through camera objective 19, the central semi-transparent portion of movable mirror 20 and small mirror 21. Field effect transistors FET1 and FET2 are respectively connected with photocells PD1 and PD2 and serve as anologue switches which are alternatively turned on and off at a given period so that average light measurement by photocell PD1 and spot light measurement by photocell PD2 are effected in time-sharing manner.

Transistor Q1 having a collector is connected to field effect transistors FET1 and FET2, functions as a logarithmic compression element for producing between the base-emitter thereof a voltage proportional to the logarithm of a photoelectric current from photocell PD1 or PD2. Potentiometers PM1 and PM2 are connected in parallel with each other and are fed with constant current from constant current source I1. Slider W1 is positioned as a function of a set film sensitivity while slider W2 is set at a position commensurate with a preset aperture value. Thus, the circuit composed of photocells PD1 and PD2, logarithmic compression element Q1, potentiometers PM1 and PM2, and constant current source I1, produces, at slider W2 of potentiometer PM2, a signal corresponding to an exposure time suitable for a set film sensitivity, a preset diaphragm aperture value and the scene light intensity measured by photocell PD1 or PD2.

As it is generally difficult to arrange photocells PD1 and PD2 to respectively receive lights of the same intensity from a scene having a uniform brightness, the output at slider W1 is generally different in the case of average light measurement and in the case of spot light measurement. To compensate for the difference and make the signal substantially equivalent for both cases, there are provided differential amplifier A2, potentiometer PM3 and constant current source I2. Potentiometer PM3 includes a pair of sliders W3 and W4 which are alternatively connected to A-D converter 2 by analogue switch 2 in synchronization with the switching of field effect transistor FET1 and FET2 such that slider W3 is selected when transistor FET1 is conductive and slider W4 is selected when transistor FET2 is conductive. Sliders W3 and W4 are positioned to compensate for the difference of the light receiving property of photocells PD1 and PD2 such that the same output is obtained at sliders W3 and W4 for the scene having a uniform brightness. A-D converter 2 converts the analogue signal from slider W3 or W4 into a digital signal. Latch circuits 3 and 4 are controlled by pulses generated by control pulse generator 29 such that latch circuit 3 latches the digital signal converted from the signal from slider W3 upon each completion of the conversion while latch circuit 4 latches the digital signal converted from the signal from slider W4 upon each completion of the conversion. Thus, latch circuit 3 latches a digital signal corresponding to the average light measurement while latch circuit 4 latches a digital signal corresponding to the spot light measurement. It is to be understood that transistors FET1 and FET2 and anologue switch 1 are also controlled by pulses generated by control pulse generator 29 in a known manner. As the detailed construction of generator 29 is not the subject of the present invention, a detailed description of it is omitted here.

Selection switch SW2 and SW3 are manually operated to change over the connection of outputs of latch circuits 3 and 4. Terminals a2 and a3 are selected for the average light measurement exposure control mode while terminals b2 and b3 are selected for the spot light measurement exposure control mode. Manual TV signal circuit 5 generates a digital signal representative of a manually set exposure time. Switches SW4 and SW5 are manually operated for the selection of automatic and manual exposure controls. When switches SW4 and SW5 are connected to terminals a4 and a5, manual exposure control mode is selected wherein exposure time is determined in accordance with a manual setting. In this case, a signal from latch circuit 3 or 4 that has been selected by switch SW2 is directed to latch circuit 8 through switch 5 and the light measurement is indicated by the circuits hereinafter described, as a step difference from the manually set exposure time. When switches SW4 and SW5 are changed over to terminals b4 and b5, signals from latch circuits 3 and 4 are directed to latch circuits 7 and 8 depending on the connection or position of switches SW2 and SW3.

Latch circuits 7 and 8 refresh signals given through switches SW4 and SW5, for a relatively long period, for example, 0.5 second. This is for the purpose of preventing flickering of indication which would occur due to rapidly changing signals in latch circuit 3 and 4 when the signals are directly supplied to an indicating device, since A-D converter 2 converts an analogue signal to a digital signal at a millisecond rate.

Latch signal terminal 7a of latch circuit 7 is adapted to be applied with a latch pulse through AND gate 9 which in turn has one of its inputs connected with resistor R1 and switch SW6 so that AND gate 9 is normally open with a logic one signal level being applied to the input, and is closed upon closure of switch SW6 with a logic zero signal level being applied to the input.

Switch SW6 is manually closed at a desired moment during light measurement to prevent the passage of a logic one level pulse from pulse generator 29 through AND gate 9 so that the signal in latch circuit 7 is retained without being further generated. It should be understood that latch circuits 7 and 8 are arranged such that they are opened to admit input signals with a logic one signal level being applied to its latch terminal and retain the admitted signals with a logic zero signal level being applied to the latch terminal.

Timer circuit 10 is actuated in conjunction with a shutter opening operation and produces a control signal after a lapse of a time commensurate with the signal retained in latch circuit 7, subsequent to the actuation, magnet driver circuit 11 is responsive to the control signal from timer circuit 10 to deenergize electromagnet MAG, and initiates shutter closure.

Decoder 12 converts the exposure time representative signal retained in latch circuit 7 into a signal suitable for numerical indication with seven segments by display device 13. The display device 13 is arranged in the view finder system as shown in FIG. 3 such that the numerical indication 13a can be observed beside the right hand edge of the viewfinder field of view as seen in FIG. 2. Subtraction circuit 14 generates a difference signal as a function of the difference between the outputs of latch circuits 7 and 8 applied to a pair of inputs thereof. Decoder circuit 15 converts the output of subtraction circuit 14 into a signal suitable for the indication by indicator 16. Indicator 16 comprises two sets of dot indicator elements, such as composed of light emitting diodes, 16a–16f and 16a′–16f′ which are arranged to be viewed in a vertical line on the upper and lower sides of the numerical display 13a. (see FIG. 2) Indicator 16 is arranged such that anyone of elements 16a–16f is energized when the exposure time corresponding to the signal from latch circuit 8 is shorter than that corresponding to the signal from latch circuit 8. In other words, the energized one of elements 16a–16f shows how many steps the portion of a scene for which light measurement for the signal in the latch 8 was made, would be over-exposed with the exposure according to the numerical indication. In this sense, it is hereinafter referred to that elements 16a–16f indicates over-exposure with respect to the value numerically indicated, with the order or the number of steps of each element from the numerical indication 13a representing the degree of the over-exposure in terms of exposure steps according to the APEX system. For instance, if element 16a is energized, one step over exposure is indicated. In like manner, dot indicator elements 16a′–16f′ indicate under-exposure with respect to the numerically indicated value.

In operation, assume that the automatic exposure control mode according to average light measurement i.e. average light measurement exposure control is selected with switches SW2 and SW3 being connected to terminals a2 and a3 and switches SW4 and SW5 connected to terminals b4 and b5 so that signals from latch circuits 3 and 4 are respectively directed to latch circuit 7 and 8 and stored therein. Upon closure of a light measuring switch (not shown, but it is closed, for example, at the first stage of shutter release button depression in a well-known manner), the circuitry shown in FIG. 1 is energized. Then, to and in latch circuits 3 and 4 are respectively alternatively applied and stored light signals corresponding to an averaged light level of a scene viewed in a viewfinder field 17 (see FIG. 2) i.e. an average light measurement and a brightness at the portion viewed within the circle 18, i.e. a spot light measurement. The signals in latch circuits 3 and 4 are renewed periodically at the period of about double the speed at which A-D converter 2 converts an anologue signal from slider W3 or W4 into a digital signal. Latch circuits 7 and 8 releases the signals therein at a speed considerably slower than the signal renewing speed in latches 3 and 4. Thus, if the average light measurement and spot light measurement are, for example, 1/500 second and 1/60 second in terms of exposure time or shutter speed, the numeral "500" is displayed at the center and element 16c′ is energized to emit a light showing three-step under-exposure. From this, the user will recognize that the portion measured by the spot light measurement is darker by three steps i.e. 3 EV in the sense of APEX system than the average level.

With closure of SW6, the signal retained in latch 7 at the moment of the switch operation will be held therein without being released. After the average light measurement signal is fixed in this way, the camera may be directed to desired directions with the circle 18 in the viewfinder field being selectively overlapped with the images of desired portions, so that the brightness at each portion will be seen in relation with the average light level. It is to be noted that the signal in latch circuit is periodically released even after the closure of switch SW6.

Thus, the user may determine, in accordance with the displayed information and taking account of characteristics of the film, such as film-ratitude, and of his intention in the picture taking, whether he carries out the picture taking with the numerically indicated shutter speed, or with a shutter speed adjusted from the indicated value in accordance with the indication by dot, or the camera operator changes over the exposure control mode from the average light measurement to the spot light measurement exposure control mode. If the camera operator performs shutter release operation, exposure will be controlled in accordance with the signal stored in latch circuit 7. It is to be understood that the signal renewing operation of latch 7 is interrupted during the exposure, even if switch SW6 is not operated.

For spot light measurement exposure control, switches SW2 and SW3 are changed over to terminals b2 and b3 so that a signal from latch circuit 3 representative of an average light measurement is directed to latch circuit 8, while a signal from latch circuit 4 representative of a spot light measurement is directed to latch circuit 7. Thus, the result of the spot light measurement is numerically displayed at the position 13, while the result of the average light measurement is displayed. In this case, the result of the spot light measurement may be fixed by the operation of switch SW6 at a desired time.

If switches SW4 and SW5 are connected to terminals a4 and a5, manual exposure time control mode is selected wherein exposure time is controlled in accordance with manually set shutter speed. In this case, numerical display device 13 displays the value of the set shutter speed, while the result of spot light measurement or average light measurement, depending on the position of switch SW4, is displayed in the form of a dot by any one of the elements 16a–16f and 16a′–16f′ as a step difference from the set value.

The display device may include a means for selectively displaying marks A, S and M in conjunction with the position of switches SW2, SW3, SW4 and SW5 to indicate which exposure control mode is selected. The mark A, S and M may respectively represent average light measurement automatic exposure control mode, spot light measurement automatic exposure control mode and manual exposure control mode. Although the above display system wherein one indication is numerically displayed with the other displayed in the form of dot, is advantageous in that the user can visually recognize easily and clearly two kinds of information without failure and without any mental calculation, the dot form display for the indication of the difference may be replaced by another numerical display so that two indications are numerically displayed.

In the above embodiment, the outputs of two photocells are alternatively derived, with the output terminals of the light measuring circuit and latch circuits being switched in synchronization with the selection of photocell outputs. However, the outputs of the photocells may be parallelly directed to latch circuits 3 and 4 through respective exposure calculation circuits and A-D converter circuits.

Further, the exposure factor to be indicated is not limited to the exposure time, but a diaphragm aperture value may be indicated in place thereof in substantially the same manner, for the camera having a shutter-speed-priority automatic diaphragm control system. It will be apparent that various known optical systems may be employed for the spot and average light measurement in place of the systems shown in FIG. 3.

Figure 4:
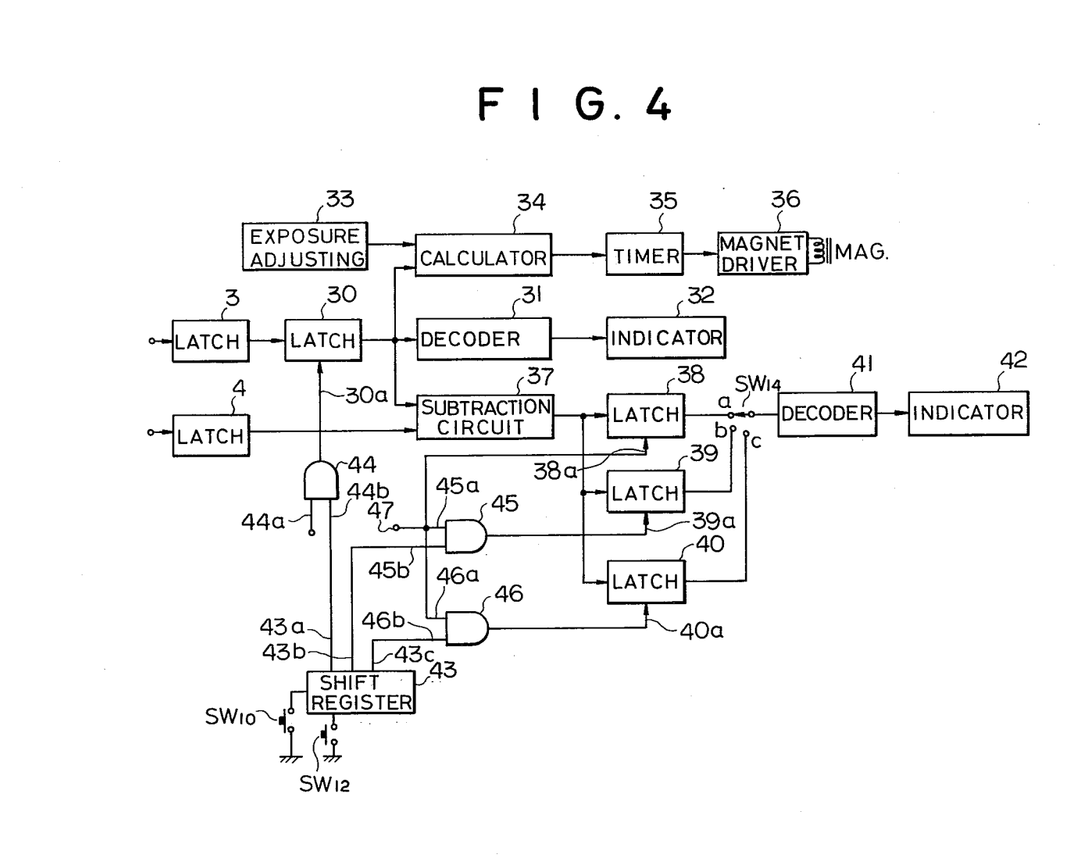
FIG. 4 is a schematic diaphragm showing a modification of the circuitry shown in FIG. 1.

With respect to FIG. 4, which shows another embodiment of the present invention wherein a plurality of light signals can be fixed, latch circuits 3 and 4 are substantially the same as those shown in FIG. 1, and are alternatively supplied with the output of A-D converter circuit 2 in like manner as in the circuitry of FIG. 1, so that a digitally converted light signal as a function of the output of photocell PD1 is stored in latch circuit 3 and the same kind of signal as a function of the output of photocell PD2 is stored in latch circuit 4. The signals in latch circuits 3 and 4 are also rapidly renewed at a given period.

In FIG. 4, latch circuit 30 retains and fixes the signal from latch circuit 3 at a desired moment during light measurement, in response to manual operation of a switch, subsequently described in detail. The signal from latch circuit 3 represents the average light level of a scene to be photographed. Decoder 31 converts the signal from latch circuit 30 into a signal suitable for the indication by indicator device 32, which in turn displays a numerical indication with a seven segment system, for example, at the central portion at the right hand side of a camera viewfinder field 17 as shown in FIG. 2. Exposure adjusting circuit 33 generate a digital signal as a function of the manually set exposure adjusting coefficient. The coefficient may be expressed in the form of $\frac{1}{4}$, $\frac{1}{2}$, 1, 2 and 4 which indicates how much the exposure is to be multipled. In normal exposure without exposure adjustment, the coefficient 1 is selected, so that the signal from latch circuit 30 is directed, without being modified, to timer circuit 35 to control exposure time in accordance with the result of average light measurement. If coefficient 2 is manually selected, calculator circuit 34 combines the signals from latch circuit 30 and from exposure adjusting circuit 33 to supply to timer circuit 35 a signal corresponding to an exposure time twice as, long as i.e. one step longer than that corresponding to the signal from latch circuit 30. It is to be noted that calculator 34 may carry out addition or subtraction of the signals depending on whether the coefficient is larger or smaller than 1, since outputs from latch circuits correspond to logarithmically compressed analogue signals. Timer circuit 35, magnet driver circuit 36 and electromagnet MAG. operate substantially in the same manner as corresponding circuits and magnet in FIG. 1, to control exposure time in accordance with the signal from calculator circuit 34.

Subtraction circuit 37 generates a difference signal as a function of the difference between the signals from latch circuits 3 and 4. The subtracting operation of subtraction circuit 37 is effected at each time when analogue-to-digital conversion of the signal commensurate with the output of photocell PD2, i.e. a spot light measurement, has been completed and the converted digital signal has been stored by latch circuit 4. The output of subtraction circuit 37 is directed to latch circuits 38, 39 and 40. Latch circuits 39 and 40 are used for retaining the result of light measurement likely as latch circuit 30 and are arranged to retain the result of light measurement for desired portions of a scene as will be described in detail subsequently. It is to be understood that the latch circuits in FIG. 4 are arranged such that they are opened to admit signals applied thereto with a logic one signal level being applied to their latch terminals and closed to retain the admitted signals with a logic zero signal being applied to the latch terminals.

Block 43 comprises a shift register which generates pulses for controlling the signal retaining condition of latch circuits 30, 39 and 40. Upon closure of reset switch SW12, shift register 43 is reset to produce a logic one signal at each of output terminal 43a, 43b and 43c. Shift register 43 is arranged to also be reset in relation with a commencement of power supply and shutter release operation. If switch SW10 is closed after shift register 43 has been reset, at first, the output at terminal 43a is a logic zero level. It is to be understood that switches SW10 and SW12 are arranged to be opened immediately after their closure. Subsequently another closure of switch SW10 makes the output at terminal 43b a logic zero level and a third closure of switch SW10 makes the output at terminal 43c a logic zero level. Output terminal 43a connects to input terminal 44b of AND gate 44 of which the output in turn connects to latch terminal 30a of latch circuit 30. Outputs 43b and 43c of shift register 43 are respectively connected to input terminals 45b and 46b of AND gates 45 and 46. Output terminals of AND gates 45 and 46 respectively connect to latch terminals 39a and 40a of the latch circuits. Input terminal 44a of AND gate 44 is connected with one of the output terminals of control pulse generator circuit 29 to receive pulses at the period of about 0.5 second. Thus, the signal in latch circuit 30 is restored at the period of about 0.5 second. Terminal 47 connected to latch terminal 38a of latch circuit 38 and to input terminals 45a and 46a of AND gates 45 and 46, is connected with another output terminal of control pulse generator circuit 29 so that the output of subtraction circuit 37 is stored by latch circuit 38, 39 and 40 with the latter circuits being supplied with pulses, for example, at each completion of subtracting operation of the circuit 37.

Switch 14 is, in practice, composed of logic circuit elements and arranged to selectively and periodically connect decoder circuit 41 to latch circuits 38, 39 and 40 through terminals a, b and c in response to pulses from control pulse generator circuit 29, so that the outputs of latch circuits 38, 39 and 40 are subsequently transmitted to decoder circuit 41 in a time sharing manner. Indicator circuit 42 controls the dot indication by the indicator elements such as LEDs 16a–16f and 16a'–16f' in like manner as the indication by the indicator 16 in FIG. 16. Elements 16a–16f indicate over-exposure with respect to the numerically indicated value while elements 16a'–16f' indicate under-exposure, by being selectively energized in accordance with the output of decoder 41.

In operation, when a light measuring switch or power switch (not shown) is closed, for instance, at the first stage of shutter button depression, to energize the circuitry, latch circuits 3 and 4 are alternatively and periodically supplied with the output of A-D converter 2 such that a signal corresponding to an average light measurement for the scene observed in the viewfinder field 17 of FIG. 2 is retained in latch circuit 5 while a signal corresponding to a spot light measurement for the portion of a scene observed within circle 18 is retained in latch circuit 4 with the signals being restored over a short period. At the initial stage, shift register 43 has been reset in relation to the closure of the light measuring switch to generate at each output terminal 43a, 43b and 43c a logic one signal. Accordingly, AND gates 44, 45 and 46 are open and latch circuits 30, 38, 39 and 40 are periodically fed with latch pulses. Thus, in latch circuit 30, the light representative digital signal is restored at a period of 0.5 second with indicator circuit 32 indicating numerically the exposure time commensurate with the signal being restored in latch circuit 30. At the initial stage, latch circuits 38, 39 and 40 admit and store the same output of subtract circuit 16 so that a single indication is effected through indicator circuit 42 by the dot indication elements 16a–16f and 16a'–16f'.

When the camera operator manually closes switch SW10 after properly framing a desired scene to be photographed, the output at terminal 43a of shift register 43 is made a logic zero level to close gate 44 so that the signal in latch circuit 30 is retained without being further restored. Subsequently, if the camera operator closes switch SW10 again aiming at a particular portion of a scene with center circle 18 of the viewfinder, the output at terminal 43b is made a logic zero level to close AND gate 45 so that latch circuit 39 retains a signal corresponding to the difference between the signals respectively retained in latch circuits 30 and 38. The signal in latch circuit 30 corresponds to an average light level at the time when switch SW10 is closed the first time, while the signal in latch circuit 39 corresponds to a brightness of the portion aimed at when switch SW10 is closed the second time. Thus, indicator circuit 42 indicates, by time sharing, two kinds of difference signals, one derived from latch circuit 38 and 40 and the other derived from latch circuit 39. The former difference signal is restored at each completion of analogue-to-digital conversion of the signal to be applied to latch circuit 4, while the latter is fixed. If the switch SW14 is arranged to change over the connection at high speed, indications in response to the two kinds of difference signals alternate at such a high speed that two indications are seen as if they are displayed at the same time when the two kinds of difference signals are different from each other. If the camera operator closes switch SW10 further again a third time, aiming at another portion of the scene, e.g. low brightness or a dark portion, the output at terminal 43c of shift register 43 is made a logic zero level to close gate 46 so that latch circuit 40 retains the difference signal applied thereto at that time. Thus, when switch SW10 has been closed three times, indicator circuit 42 is responsive to three difference signals which are supplied subsequently and periodically through switch circuit SW14 from latch circuits 38, 39 and 40. In this case three kinds of information of spot light measurement are displayed with the indication corresponding to the signal from latch circuit 38 changing periodically while the indications corresponding to the other signal are fixed. The circuit for the latch circuits 38, 39 and 40 and switch circuit SW14 may be arranged such that signal transmission from latch circuit 38 is interrupted to disable the indication in response to it when both latch circuits 39 and 40 have retained signals therein.

When the manual operations for light measuring as mentioned above have been performed, indicator circuit 32 displays at the center 31a a numerical indication, for example, numerals "500" showing exposure time of 1/500 second, while indicator circuit 42 constantly energizes, for example, element 16b showing two step over-exposure with respect to the numerically indicated value according to average light measurement, and element 16c' showing three step under-exposure. Further, the indicator circuit 42 may energize another element in accordance with the signal from latch circuit 38 showing a spot light measurement for a portion of a scene that is being aimed at as the indication is being displayed. If reset switch SW12 is closed, the retainment of signals by or in latch circuits 30, 39 and 40 is released.

The camera operator may determine, in accordance with such indication and taking account of his intended picture, what coefficient should be set on exposure adjusting circuit 33. If he releases the camera shutter after selecting a desired exposure adjusting coefficient, exposure is controlled automatically in accordance with the signal from calculator circuit 34.

As a modification, another latch circuit may be connected to latch circuit 4 and selectively connected with decoder 31 such that the result of spot light measurement is retained and displayed. Further, the circuitry of FIG. 4 may be arranged such that latch circuits 30, 39 and 40 are controlled by separate manual switches in place of single switch SW10. Still further, it is to be understood that various modifications mentioned above in connection with the embodiment of FIG. 1 may also apply to the embodiment of FIG. 4.

Having described my invention as related to the embodiments shown in the accompanying drawing, it is understood by those skilled in the art that various changes and modification may be made in the invention. In principle, it is sufficient for the presend invention if it is provided with a light measuring means for detecting an average light level of a scene and a brightness of a small portion of the scene, and an indicator for indicating one of the detected values and the amount of difference therebetween. Therefore, both indications may be made by dots by, for example, LED's lined up, or in the form of numerical seven-segment display as mentioned before. Further, the circuit for the indication may not necessarily be in digital form, but may be an analogue circuit associated with an ammeter or other suitable indication device. It will be apparent that in the case of indication by means of dot display for the two values, i.e. an average light measurement and a spot light measurement, or in the case of indication by means of the combination of the dot display and the ammeter, the distance between the indicating dot elements or between an indicating dot and an ammeter needle will indicate the amount of difference between the values.

However, if one of the values is indicated by an absolute value such as in the form of a digital numerical display, with the other value being shown as a deviation from the absolute value as in the case of the embodiments explained above, the measured value can be easily read and the deviation can be compared with the ratitude of the film being used. Further, if the indication for the two values is displayed in the form as shown in FIG. 2, it is compact in arrangement and easy to see.

I claim:

1. An exposure indicating device for a photographic camera comprising:
   a first light detecting means for detecting the light level of a substantial portion of a scene to be photographed and generating a first output;
   a second light detecting means for detecting the brightness at a small portion of the scene and generating a second output;
   a first indicator means selectably connectable to said first and second light detecting means for indicating said first or second output, said indication being in the form of a numerical representation;
   switching means for selectively connecting said first indicator means to said first and second light detecting means;

means for detecting the amount of the difference between said first and second outputs; and a second indicator means for indicating the amount of the difference.

2. An exposure indicating system as in claim 1 wherein said second indicator means further includes a plurality of dot indication elements which are selectively actuated for the indication of said difference.

3. An exposure indicating system as in claim 1 further comprising a first retaining means for retaining the output of said first detecting means; a second retaining means for retaining the output of said second detecting means and means for selectively connecting either one of said first and second retaining means with said first indicator means, and wherein said means for detecting the amount of difference includes calculator means coupled with said first and second retaining means for calculating the amount of difference between the signals respectively retained in said retaining means.

4. An exposure indicating system as in claim 1 further comprising a signal means for generating a control signal in response to a manual operation, a retaining means for retaining an input signal applied thereto in response to said control signal, a switch means for selectively connecting either one of said outputs of said first and second light detecting means with said retaining means thereby applying one of the outputs to said retaining means as an input signal, said first indicator means being connected with said retaining means, and said means for detecting the amount of difference being connected with said retaining means and the other of said light detecting means.

5. An exposure indicating system as in claim 1 wherein said second indicator means includes a plurality of indicator elements arranged to present an indication in alignment with the numerical indication by said first indicator means such that the extension from the latter to the former indication shows said amount of the difference.

6. An exposure indicating system as in claim 5 wherein said plurality of indicator elements includes a plurality of dot indication elements arranged to be displayed on both sides of and in alignment with said numerical indication by said first indicator means, said dot indication elements being selectively actuated.

7. An exposure indicating system as in claim 6 wherein said dot indication elements are light emitting diodes.

8. An exposure indicating system as in claim 1 further comprising a signal means for generating control signals in response to manual operations, a first retaining means responsive to said control signal for retaining an input signal applied thereto, said first retaining means being connected with said first indicator means, a second retaining means for retaining the output signal from said means for detecting the amount of difference in response to another control signal from said signal means subsequent to the control signal for said first retaining means, and means for coupling said second indicator means with both said second retaining means and said means for detecting the amount of difference such that said second indicator means indicates the retained amount of difference and a changing amount of difference.

9. An exposure indicating system as in claim 8 further comprising a third retaining means for retaining the output signal from said means for detecting the amount of difference, in response to a further control signal from said signal means subsequent to the control signal for said second retaining means, said means for coupling also coupling said third retaining means with said second indicator means.

10. An exposure indicating system as in claim 9 wherein said means for coupling includes a switch means for selectively connecting said means for detecting the amount of difference and said second and third retaining means with said second indicator means at a high switching speed.

11. An exposure indicating system as in claim 9 further comprising means for distributing control signals to said first, second and third retaining means in accordance with the number of said manual operations.

12. An exposure indicating system as in claim 8 wherein said means for coupling includes switch means for selectively connecting said means for detecting the amount of difference and said second retaining means with said second indicator means at a high switching speed.

13. An exposure indication and control system for a photographic camera comprising:
a first light detecting means for detecting the light level of a substantial portion of a scene to be photographed and generating a first output;
a second light detecting means for detecting the brightness at a small portion of said scene and generating a second output;
an exposure control means for controlling camera exposure in response to one of the values detected by said first and second light detecting means;
switching means for selectively connecting said exposure control means to said first or second light detecting means;
a first indicator means for indicating the exposure value to be controlled by said exposure control means, said first indicator means including means for presenting the indication in the form of a numerical representation;
means for detecting the amount of the difference between said first and second outputs; and
a second indicator means for indicating the amount of said difference.

14. An exposure indication and control system as in claim 13 wherein said second indicator means includes a plurality of dot indication elements arranged to be displayed in the viewfinder field of the camera in alignment with said numerical indication by said first indicator means, and selectively actuated such that the distance from said numerical indication to the actuated element shows said difference.

15. An exposure indication and control system as in claim 13 further comprising a retaining means coupled with said exposure control means and said first indicator means, said switching means including a switch member for selectively connecting either one of said first and second light detecting means with said retaining means, said retaining means being arranged to retain the signal applied through said switch member.

16. An exposure indication and control system as in claim 15 further comprising a second retaining means for retaining the output of said means for detecting the amount of said difference, means for actuating said retaining means and said second retaining means in response to manual operations, and means for coupling said second retaining means and said means for detecting the amount of difference with said second indicator means.

17. An exposure indication and control system as in either claims 1 or 13, wherein said means for detecting the amount of difference includes a calculator circuit for calculating the subtraction of one of said first and second outputs from the other, and said second indicator means being arranged to show whether the result of the subtraction is plus or minus.

* * * * *